United States Patent [19]

Kirimoto et al.

[11] B 3,997,507
[45] Dec. 14, 1976

[54] NOVEL OIL AND WATER REPELLENT COMPOSITION

[75] Inventors: Kazusuke Kirimoto; Takao Hayashi, both of Yokohama, Japan

[73] Assignee: Asahi Glass Co., Ltd., Tokyo, Japan

[22] Filed: May 16, 1974

[21] Appl. No.: 470,576

[44] Published under the second Trial Voluntary Protest Program on February 24, 1976 as document No. B 470,576.

Related U.S. Application Data

[63] Continuation-in-part of Ser. No. 291,335, Sept. 22, 1972, abandoned.

[52] U.S. Cl. .............. 260/63 UY; 260/29.6 T; 260/33.8 F; 260/63 HA; 260/78.5 R; 260/79.3 MU; 260/79.7; 428/265; 428/264; 428/270; 526/245; 526/250; 526/271; 526/292; 526/296; 526/303; 526/304; 526/325; 526/332; 526/337

[51] Int. Cl.² .............. C08F 214/18; C08F 216/18; C08F 216/20

[58] Field of Search ...... 260/80.76, 86.1 R, 63 UY, 260/63 HA, 78.5 R, 79.3 MU, 80.7, 79.7, 80.73, 80.75, 86.1 N; 450/717.5, 718

[56] References Cited

UNITED STATES PATENTS

| | | | |
|---|---|---|---|
| 2,991,277 | 7/1961 | Schildknecht | 260/86.1 |
| 3,025,279 | 3/1962 | Barr | 260/86.1 |
| 3,306,879 | 2/1967 | Pattison | 260/77.5 |
| 3,341,497 | 9/1967 | Sherman et al. | 260/72 |
| 3,403,122 | 9/1968 | Sherman et al. | 260/29.6 |
| 3,532,659 | 10/1970 | Hager et al. | 260/29.6 |
| 3,546,187 | 12/1970 | Tandy | 260/80.76 |
| 3,775,386 | 11/1973 | Citron | 260/80.3 E |

*Primary Examiner*—Stanford M. Levin
*Attorney, Agent, or Firm*—Oblon, Fisher, Spivak, McClelland & Maier

[57] ABSTRACT

A novel oil- and water-repellent composition which comprises a copolymer of at least 25 weight percent of a fluoroalkyl monomer and an alkylvinyl ether having the formula: $CH_2=CH-OR$ wherein R represents a halogen substituted lower alkyl group.

2 Claims, No Drawings

NOVEL OIL AND WATER REPELLENT COMPOSITION

CROSS-REFERENCE TO RELATED APPLICATIONS

This application is a Continuation-In-Part of U.S. application Ser. No. 291,335, filed Sept. 22, 1972 and now abandoned.

BACKGROUND OF THE INVENTION

1. Field of the Invention

This invention relates to a novel oil- and water-repellent compositon. More particularly, it relates to a novel oil- and water-repellent composition of improved softness which consists of a copolymer containing units of a fluoroalkyl monomer and units of a alkylvinylether.

2. Description of the Prior Art

Heretofore, oil- and water-repellent compositions have been known which contain a polymer prepared from a fluoroalkyl monomer, such as an acrylic acid ester or a methacrylic acid ester containing a perfluoroalkyl group, or a copolymer prepared from a polymerizable fluoroalkyl monomer and a polymerizable monomer such as an acrylic ester, maleic anhydride, chloroprene, butadiene or methylvinylketone. The conventional oil- and water-repellent compositions possess satisfactory oil-repellency to fatty oils and petroleum materials when applied to fabrics, and the like. However, materials treated with these compositions have not been resistant to stains, particularly hand stains. Moreover, when conventional oil- and water-repellent compositions are applied to fabrics, the treated fabrics sometime tend to be easily stained with dry soil. Thus, the treated fabrics may be easily soiled or stained by dirty hands, rendering use of these compositions impractical.

In addition, the conventional oil- and water-repellent copolymer compositions containing fluoroalkyl monomers have the following disadvantages: Fabrics treated with conventional oil- and water-repellent compositions suffer a loss in their softness and hand qualities. For example, the fabrics lose their softness and hand by becoming more stiff. These disadvantages present serious problems for the various commercial applications of the compositions, especially when used to treat fabrics.

SUMMARY OF THE INVENTION

Accordingly, it is an object of this invention to provide novel oil- and water-repellent compositions which provide improved oil-, water-, and stain-repellency to treated fabrics without any reduction in the softness and hand qualities of the fabric.

This object and other objects of this invention are achieved by preparing an oil- and water-repellent composition containing a copolymer of at least 25 weight percent of a fluoroalkyl monomer and an alkylvinyl ether having the formula:

$CH_2=CH-O-R$ wherein R represents a halogen substituted lower alkyl group ($C_1$-$C_7$).

DESCRIPTION OF THE PREFERRED EMBODIMENTS

The specific alkylvinyl ethers of this invention have the formula:

$CH_2=CH-O-R$ wherein R is as defined above. Suitable examples include chloromethylvinyl ether, bromomethylvinyl ether, 2-chloroethylvinyl ether, chloropropylvinyl ether, and the like.

The weight range of molecular weights of the copolymers of this invention is from 5,000 to 50,000 as measured by vapor pressure osmometer tests.

It is especially preferably to use 2-chloroethylvinyl ether from the standpoint of its ability to copolymerize with fluoroalkyl monomers, its availability and the effectiveness of its properties on the resulting oil- and water-repellent compositions. The ratio of the specific alkylvinyl ether to the total monomer content can be selected depending upon the types of fluoroalkyl monomers and the types and amount of other monomers used. If the amount of the specific alkylvinyl ether used is too great, the oil-, stain-, and water-repellency of the composition is decreased. Accordingly, less than 50 weight percent of the specific alkylvinyl ether in relation to the total monomer content is usually used. If the amount of the specific alkylvinyl ether used is less than 0.5 weight percent, the stain-repellency, softness and hand imparted to treated fabrics are not satisfactory. The inclusion of 1.5 – 35 weight percent of the alkylvinyl ether in the copolymer containing the fluoroalkyl units, provide optimum stain-repellency, softness and hand feel can be imparted to fabrics treated with the composition.

The fluoroalkyl monomers used in forming the copolymer of this invention can be any of the unsaturated esters, such as acrylates and methacrylates, containing $C_{3-15}$ perfluoroalkyl groups. Suitable examples include:

$CF_3CF_2)_7(CH_2)_{11}OCOCH=CH_2$,
$CF_3(CF_2)_4CH_2OCOC(CH_3)=CH_2$,
$(CF_3)_2CF(CF_2)_6(CH_2)_3OCOCH=CH_2$,
$(CF_3)_2CF(CF_2)_{10}(CH_2)_3OCOCH=CH_2$,
$CF_3(CF_2)_6(CH_2)_2OCOC(CH_3)=CH_2$,
$(CF_3)_2CF(CF_2)_6(CH_2)_2OCOCH=CH_2$,
$CF_3(CF_2)_7SO_2N(C_3H_7)(CH_2)_2OCOCH=CH_2$,
$CF_3(CF_2)_7(CH_2)_4OCOCH=CH_2$,
$CF_3(CF_2)_7SO_2N(CH_3)(CH_2)_2OCOC(CH_3)=CH_2$,
$CF_3(CF_2)_7(CH_2)_3COOCH=CH_2$,
$(CF_3)_2CF(CF_2)_6CH_2CH(OH)CH_2OCOCH=CH_2$,
$(CF_3)_2CF(CF_2)_6CH_2CH(OCOCH_3)OCOC(CH_3)=CH_2$.

Other suitable fluoroalkyl monomers include:

$CF_2ClCF_3CF(CF_2)_7CONHCOOCH=CH_2$,
$H(CF_2)_{10}CH_2OCOCH=CH_3$,
$CF_2Cl(CF_2)_{10}CH_2OCOC(CH_3)=CH_2$.

Monomers containing a perfluoroalkyl group are preferably used, although other fluoroalkyl monomers copolymerizable with the alkylvinyl ethers may also be used. The ratio of fluoroalkyl units in the copolymer is at least 25 weight percent, preferably 40 weight percent. Other types of monomers containing no fluoroalkyl groups may also be copolymerized with the alkylvinyl ethers of this invention. Suitable monomers include: ethylene, vinylacetate, vinylfluoride, vinylidenehalide, acrylonitrile, styrene, α-methylstyrene, p-methylstyrene, acrylic acid, alkyl acrylate, methacrylic acid, alkyl methacrylate, acrylamide, methacrylamide, diacetoneacrylamide, methyloldiacetoneacrylamide, vinylalkylether, vinylalkylketone, butadiene, isoprene, chloroprene, glycidyl acrylate, maleic anhydride, and mixtures thereof. When these non-fluoroalkyl containing monomers are copolymerized with the two other monomers, various other properties of the copolymers such as dry-cleaning resistance, washing resistance, solubility, hardness, hand feel, and the like, as well as oil-, water- and stain-repellency are improved.

Studies have shown that conventional oil- and water-repellent compositions have a satisfactory oil-repellency but an insufficient water-repellency. In order to improve the water-repellency of these compositions, water-repellent compounds such as quaternary pyridinium salts and paraffin waxes have been added. In this invention, when vinylchloride is copolymerized in a limited ratio with the other monomers, the durability, softness and hand feel of the fabrics treated with the resulting copolymers are not reduced because of the addition of vinylchloride. The copolymers prepared by copolymerizing a fluoroalkyl monomer, the specific alkylvinyl ether, vinylchloride and either styrene, an alkyl acrylate or an alkyl methacrylate, have a selective solubility in certain organic solvents such as methylchloroform, trichlorotrifluoroethane, and the like. These copolymers can be advantageously used as aerosols or in organic solvent solutions.

In accordance with this invention, when at least 45 weight percent of a fluoroalkyl monomer, 0.5 - 25 weight percent of a monomer having the formula $CH_2 = CH - O - R$ (wherein R represents a halogen substituted lower alkyl group), 5 - 30 weight percent vinylchloride and, if necessary, less than 20 weight percent styrene, an alkyl acrylate or an alkyl methacrylate constitute the units of the oil- and water-repellent copolymer, the copolymer can impart an excellent degree of oil-, water- and stain-repellency, softness, hand feel, solubility, and the like to fabrics treated with the copolymer. Especially preferred from the standpoint of commercial use and availability are those copolymers which contain certain copolymerizable fluoroalkyl monomers, such as an acrylic acid ester or a methacrylic acid ester containing a perfluoroalkyl group and having the formula:

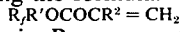
$R_fR'OCOCR^2 = CH_2$ wherein $R_f$ represents a straight or branched chain perfluoroalkyl group containing $C_{3-15}$ carbon atoms; $R'$ represents a straight or branched chain alkylene group containing $C_{1-10}$ carbon atoms; and $R^2$ represents a hydrogen atom or a methyl group.

The copolymers of this invention can be formed by bulk polymerization, solution polymerization, suspension polymerization, emulsion polymerization, radiation polymerization or photopolymerization reactions. For example, a mixture of the monomers can be emulsified in water in the presence of a surface active agent and copolymerized with stirring. Suitable polymerization initiators can be used in the polymerization reactions, such as benzoyl peroxide, lauroyl peroxide, t-butyl perbenzoate, 1-hydroxy cyclohexyl hydroperoxide, 3-carboxypropionyl peroxide, acetylperoxide, azo-bis-isobutylamidine-2-hydrochloride, azobisisobutyronitrile, sodium peroxide, potassium persulfate and ammonium persulfate. Ionizing radiation such as γ-rays can also be used to initiate the reactions. Surface active agents include various types of anionic, cationic and nonionic emulsifiers. Suitable anionic emulsifiers include sodium $C_{16-18}$ alkenyl sulfate acetate, sodium oleat, sodium oleate methylsulfate, ammonium ω-H-pollyfluoro-alkanoate containing 8 - 10 -carbon atoms, ammonium fluoroalkanoate, sodium $C_{10-18}$ alkylsulfate, sodium $C_{12-18}$ alkylbenzenesulfonate and sodium alkylnaphthalenesulfonate. Suitable cationic emulsifiers include dodecylmethylbenzyl trimethyl ammonium chloride, benzyl dodecyl dimethyl ammonium chloride, N-[2-(diethylamino)ethyl]-oleylamide hydrochloride, dodecyl trimethyl ammonium acetate, trimethyl tetradecyl ammonium chloride, hexadecyl trimethyl ammonium chloride and trimethyl octadecyl ammonium chloride. Suitable nonionic emulsifiers include polyoxyethylene hexylphenol, isooctylphenol, nonylphenol and higher $C_{12-18}$ fatty alcohol ethers, higher polyoxyethylene $C_{12-18}$ fatty acid esters, polyoxyethylene $C_{12-16}$ alkanethiols, polyoxyethylene $C_{12-18}$ alkylamines, and polyoxyethylene sorbitane alkanoate.

The monomers may be dissolved in a suitable organic solvent, and a solution polymerization reaction is conducted in the presence of a polymerization initiator such as a solvent soluble peroxide, an azo compound or ionizing radiation. Suitable organic solvents for the solution polymerization include tetrachlorodifluoroethane, methylchloroform and the like. Aerosol type, organic solvent type or latex type oiland water-repellent compositions of this invention can be directly prepared by solution polymerization or emulsion polymerization. The oil- and water-repellent compositions containing the copolymer of this invention can be prepared as emulsions, solutions, aerosols, and the like by conventional methods. For example, an aqueous emulsion composition can be directly prepared by an emulsion polymerization method, and a solvent solution composition can be directly prepared by a solution polymerization method. Solution type compositions can also be prepared by dissolving the copolymer prepared by a bulk polymerization method or an emulsion polymerization method in a suitable organic solvent such as acetone, methylethylketone, diethyl ether, methylchloroform, trichloroethylene, tetrachloroethylene, chlorofluorohydrocarbons, e.g., tetrachlorodifluoroethane, trichlorotrifluoroethane, or mixtures thereof. Aerosol type compositions can be prepared by packing the solution with a propellant such as dichlorodifluoromethane, monofluorotrichloromethane, dichlorotetrafluoroethane and the like in an aerosol container.

The oil- and water-repellent compositions of this invention can be applied by various methods depending upon the form of the composition and the type of articles treated. For example, when the composition is an aqueous emulsion or a solution composition, the composition is coated on the surface of an article by a conventional dip coating method or any other coating method and dried. If necessary, certain cross-linking agents are added to cure the copolymers. If the oil- and water-repellent composition is used as an aerosol, it may be sprayed on an article and dried leaving a satisfactory oil-, water-, and stain-repellent article.

It is possible to apply the oil- and water-repellent compositions of this invention together with other water-repellent compositions and oil-repellent compositions containing insecticides, flameproofing agents, antistatic agents, dye fixing agents, shrink-proofing agents, and the like. The types of articles treated by the oil- and water-repellent compositions of this invention are not limited, and can be fibrous fabrics, glass, paper, wood, leather, wool, asbestos, brick, cement, metal, metal oxides, ceramics, plastics, coating surface and plaster. The fibrous fabric can be made of natural fibers such as cotton, hemp, wool, silk; synthetic fibers such as polyamides, polyesters, polyvinylalcohols, polyacrylonitriles, polyvinylchlorides, polypropylenes, polytetrafluoroethylenes, semi-synthetic fibers such as rayon, acetate and glass fiber, and mixtures thereof.

Having generally described the invention, a more complete understanding can be obtained by reference to certain specific examples, which are included herein for purposes of illustration only and are not intended to be limiting unless otherwise specified.

In the examples, water-repellency and oil-repellency are shown by the following standards. Water-repellency is measured by the ASTM D583-63 spray method and is placed on a scale as shown in Table I. Oil-repellency of the compositions is measured by the falling drop method in n-heptane and Nujol and mixtures thereof in the ratios shown in Table II. The drop is observed over a period of 3 minutes, and the results are placed on a scale as shown in Table II.

TABLE I

| Water-repellency | Condition |
| --- | --- |
| 100 | No wetting of the surface |
| 90 | Small wetting of the surface |
| 80 | Visible wetting of the surface |
| 70 | Partial wetting of the surface |
| 50 | Full wetting of the surface |
| 0 | Complete wetting of both surfaces |

TABLE II

| | Composition | |
| --- | --- | --- |
| Oil-repellency | n-heptane (% vol.) | Nujol (% vol.) |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | 100% Nujol is not held | |

In the following examples, the + symbol next to some numbers indicate a number higher than the base numbers.

The stain-repellency tests were conducted as follows:
A 30 g quantity of the Standard Synthetic Dry Soil having the composition listed below was filled in a box 30 cm × 20 cm × 5 cm in size. A sample of an untreated fabric and a treated fabric (7.5 cm × 5 cm) were placed in the box and severely shaken for one minute to stain the fabrics. The stained fabrics were batted to remove the stain and reflectance measurements of each fabric at 450 m μ was measured. Stain-repellency was calculated from reflectance measurements and placed on a scale wherein 100 designates the stain-repellency of the unstained fabric and 0 designates the repellency of the stained untreated fabric.

| Standard Synthetic Dry Soil | |
| --- | --- |
| | weight percent |
| Peat | 38 |
| Cement | 17 |
| Potter soil | 17 |
| Silica | 17 |
| Activated carbon | 1.75 |
| Ferric oxide | 0.5 |
| Mineral oil | 8.75 |

Higher values show a greater stain-repellency. Data having a mark show lower reflection values than stained untreated fabrics, which show a very low stain-repellency value.

The softness tests were conducted as follows:
The stiffness of the untreated fabric and the treated fabric were measured by the Japan Industrial Standard L-1079 slide method, wherein a test fabric 15 cm in length and 2 cm in width was used and its bending moment at a length of 5 cm was measured. Its softness was calculated by the following expression:

$$\text{Softness} = \frac{\text{Stiffness of untreated fabric}}{\text{Stiffness of treated fabric}}$$

Low values indicate a greater softness. The degree of softness of an untreated fabric is assigned a value of one. Hand feel measurements are indicated by 3 words wherein "excellent" means the feel of the treated fabric has the same hand feel as the untreated fabric, "good" means that the feel of the treated fabric is rather a stiff feeling, and "not good" means that the feel of the treated fabric is quite stiff.

EXAMPLE 1

In this example, a typical solution polymerization method for preparing a copolymer of this invention is illustrated by the synthesis of the copolymer containing a fluoroalkyl monomer, 2-chloroethylvinylether-vinylchloride-styrene. In a 2 liter autoclave made of stainless steel (SUS-27) equipped with a thermostat and an electromagnetic stirrer, 10 g of styrene, 375 g of $CH_2=CHCOO(CH_2)_3(CF_2)_7CF_3$, 15 g of 2-chloroethylvinyl ether, 1,000 g of methylchloroform and 15 g of azobis-isobutyronitrile were charged. The mixture was flushed by bubbling nitrogen gas for about 1 hour through the solution to remove almost all of the oxygen in the mixture. A 100 g quantity of vinylchloride (99.9% pure) was added to the autoclave under pressure, and the temperature of the autoclave was gradually raised. The mixture was copolymerized at 70°C. for 16 hours while stirring the mixture. The conversion of the copolymer based on the fluoroalkyl monomer was 98.5%. According to an elementary analysis of the product, the analyzed value for fluorine was 47.1% while the calculated value for fluorine was 45.6%. The inherent viscosity of the copolymer in 0.50 g/100 ml of benzotrifluoride at 30°C. was 0.47.

EXAMPLE 2

In this Example, a typical emulsion polymerization method for preparing a copolymer of this invention is illustrated by the synthesis of the copolymer containing a fluoroalkyl monomer and 2-chloroethylvinylether. In the autoclave of Reference 1, 60 g of 2-chloroethylvinylether, 240 g of $CH_2=CHCOO(CH_2)_3(CF_2)_7CF_3$, 900 g of deoxygenated water; 150 g of acetone, 1.5 g of n-hexadecylmercaptan, 1.2 g of azobis-isobutylamidine dihydrochloride, and 15 g of $C_{17}H_{33}COO(CH_2CH_2O)_{14}H$ were charged. The mixture was stirred under a flow of nitrogen gas so as to emulsify and to disperse the mixture. After flushing the mixture by bubbling nitrogen gas through the autoclave for about 1 hour, the temperature of the autoclave was gradually raised while stirring the mixture, and the monomers were copolymerized at 50°C. for 9 hours.

According to a gas-chromatographic analysis, the conversion based on the fluoroalkyl monomer content was 99.3%. The resulting stable emulsion latex contained 21.8% of the copolymer. According to an elementary analysis, the analyzed value for fluorine was 47.9% while the calculated value for fluorine was 48.6%. The inherent viscosity of the copolymer in 0.50 g/100 ml of benzotrifluoride at 30°C. was 0.61.

EXAMPLES 3 – 7 AND REFERENCES 1–2

A cotton fabric, a polyester fabric and a wool fabric were used as test fabrics. Oil-and water-repellent compositions containing the copolymer of this invention or other copolymers containing no alkylvinylether units, were separately dissolved in a solvent consisting of 30 weight percent trichlorotrifluoroethane and 70 weight percent methylchloroform (n Reference 1, a solvent consisting of 60 weight percent $C_2Cl_3F_3$ and 40 weight percent $CH_3CCl_3$ was prepared) to prepare solutions containing 1.0 weight percent of the copolymers. Each test fabric was dipped in a solution for 2 minutes, squeezed and dried at room temperature. Oil-repellency, water-repellency, stain-repellency, softness and hand feel of the treated fabrics were measured and the results are shown in Table III.

In the Table:
FA represents $CH_2=CHCOO(CH_2)_3C_nF_{2n+1}$
(wherein the ratio of compounds having values of n=7,9,11 and 13 is 4 : 3 : 2 : 1 by weight);
VC represents vinylchloride;
St represents styrene;
CEVE represents 2-chloroethylvinylether ($ClCH_2CH_2OCH=CH_2$);
C represents cotton fabric;
E represents polyester fabric;
W represents wool fabric;

TABLE III

|  | Oil-and Water-repellent copolymer | Test fabric | Oil-repel. | Water-repel. | Stain-repel. | Softness | Hand feel |
|---|---|---|---|---|---|---|---|
| Example 3 | FA/VC/CEVE (75/20/5) | C | 120 | 90 | 42 | 0.99 | excellent |
|  |  | E | 130 | 100 | 39 | 0.98 |  |
|  |  | W | 130+ | & 90+ | 33 | 0.99 |  |
| Example 4 | FA/VC/St/CEVE (75/20/2/3) | C | 120+ | & 90 | 40 | 1.01 | excellent |
|  |  | E | 130 | 100 | 41 | 0.98 |  |
|  |  | W | 140 | 100 | 37 | 0.95 |  |
| Example 5 | FA/VC/St/CEVE (75/18/2/5) | C | 130 | 90 | 43 | 1.02 | excellent |
|  |  | E | 130 | 100 | 35 | 1.00 |  |
|  |  | W | 140 | 100 | 31 | 1.00 |  |
| Example 6 | FA/VC/CEVE (75/10/15) | C | 110 | 90 | 37 | 1.03 | excellent |
|  |  | E | 120 | & 90+ | 35 | 1.01 |  |
|  |  | W | 120 | 90+ | 30 | 1.01 |  |
| Example 7 | FA/CEVE (75/25) | C | 100 | & 80 | 31 | 1.02 | excellent |
|  |  | E | 100 | 90 | 33 | 1.03 |  |
|  |  | W | 110 | 90 | 28 | 1.01 |  |
| Reference 1 | FA/VC (75/25) | C | 120 | & 90+ | 39 | 0.64 |  |
|  |  | E | 130 | & 100 | 37 | 0.76 | fair |
|  |  | W | 140 | 100 | 32 | 0.88 |  |
| Reference 2 | FA/VC/St (75/20/5) | C | 130 | 90 | 40 | 0.59 |  |
|  |  | E | 130 | 100 | 41 | 0.72 | not good |
|  |  | W | 130+ | 100 | 37 | 0.82 |  |

The copolymer of FA and VC of Reference 1 was difficult to dissolve without using a solvent containing methylchloroform and more than 50 weight percent trichlorotrifluoroethane, or a solvent containing acetone. However, trichlorotrifluoroethane is expensive and acetone adversely affects the fabrics. Thus, these solvents are not practically useful for certain applications.

EXAMPLE 8

An oil- and water-repellent composition was prepared by dissolving 1 g of a copolymer prepared from 65 weight percent $CH_2=CHCOO(CH_2)_3(CF_2)_6CF(CF_3)_2$, 28 weight percent vinylchloride and 7 weight percent bromomethylvinyl ether, in 99 g of a solvent consisting of 15 weight percent trichlorotrifluoroethane and 85 weight percent methylchloroform. A polyester 65%-cotton 35% fabric was dipped in the copolymer solution for 2 minutes, squeezed and dried at room temperature for 30 minutes. The hand feel of the treated fabric was excellent. The softness, oilrepellency and water-repellency values were 0.99, 110 and 100, respectively.

EXAMPLE 9

A copolymer prepared from 70 weight percent $CF_3(CF_2)_7SO_2N(C_3H_7)CH_2CH_2OCOCH=CH_2$, 20 weight percent vinylchloride, 5 weight percent 2-chloroethylvinyl ether and 5 weight percent methyl acrylate was dissolved in methylchloroform to prepare a solution containing 1.0 weight percent of the copolymer. A cotton fabric was dipped in the solution for 2 minutes, squeezed and dried at room temperature for 30 minutes. The treated fabric had an oil-repellency of 130, a water-repellency of 100, and a stain-repellency of 45. The difference in the hand feel quality of the treated and untreated fabrics was difficult to discern.

EXAMPLE 10

A 1 g amount of a copolymer prepared from 60 weight percent $CH_2=C(CH_3)COOCH_2CH_2(CF_2)_7CF_3$, 33 weight percent vinylchloride, 5 weight percent 2-chloroethylvinyl ether and 2 weight percent butyl acrylate was dissolved in 99 g of methylchloroform. A wool fabric was dipped in the solution for 2 minutes, squeezed and dried at room temperature for 30 minutes. The treated fabric had a softness of 1.02, an excellent hand feel, an oil-repellency of 100, a water-repellency of 100, and a stain-repellency of 28.

EXAMPLE 11

A polyester fabric was dipped in an aqueous emulsion containing 1.0 weight percent of the copolymer prepared from 70 weight percent $CH_2=CHCOOCH_2CH(OH)CH_2(CF_2)_6CF(CF_3)_2$, 25 weight percent vinylchloride, 5 weight percent 2-chloroethylvinylether. The treated fabric was squeezed between two rubber rollers until 100% saturated, dried at 75°C. for 30 minutes and further cured at 120°C. for 5 minutes. The treated fabric had an excellent hand feel and an oil-repellency of 100, a water-repellency of 100, and a stain-repellency of 43.

Having now fully described the invention, it will be apparent to one of ordinary skill in the art that many changes and modifications can be made thereto without departing from the spirit or scope of the invention as set forth herein. ACCORDINGLY,

What is claimed as new and intended to be covered by Letters Patent is:

1. An oil- and water-repellent composition, which comprises: a copolymer containing at least 25 weight percent, based on the total weight of monomers, of a fluoroalkyl monomer ester having the formula:

$$R_f R'OCOCR^2 = CH_2$$

wherein $R_f$ represents a straight or branched chain perfluoroalkyl group containing $C_{3-15}$ carbon atoms; $R'$ represents a straight or branched chain alkylene group containing $C_{1-10}$ carbon atoms; and $R^2$ represents a hydrogen atom or a methyl group, $CF_3(CF_2)_7SO_2N(C_3H_7)(CH_2)_2OCOCH = CH_2$,
$CF_3(CF_2)_7SO_2N(CH_3)(CH_2)_2OCOC(CH_3) = CH_2$,
$(CF_3)_2CF(CF_2)_6CH_2CH(OH)CH_2OCOCH = CH_2$,
$(CF_3)_2CF(CF_2)_6CH_2CH(OCOCH_3)OCOC(CH_3) = CH_2$,
$CF_2ClCF_3CF(CF_2)_7CONHCOOCH = CH_2$,
$H(CF_2)_{10}CH_2OCOCH = CH_3$, or
$CF_2Cl(CF_2)_{10}CH_2OCOC(CH_3) = CH_2$; and from 5 to 50 weight percent, based on the total weight of monomers, of an alkyl vinyl ether selected from the group consisting of chloromethylvinyl ether, bromomethylvinyl ether, 2-chloroethylvinyl ether and chloropropylvinyl ether.

2. The oil- and water-repellent composition of claim 1, wherein 1.5 – 35 weight percent of said alkylvinyl ether is copolymerized with at least 25 weight percent of said fluoroalkyl monomer and a copolymerizable monomer selected from the group consisting of ethylene, vinylacetate, vinylfluoride, vinylidene halide, acrylonitrile, styrene, α-methylstyrene, para-methylstyrene, acrylic acid, alkyl acrylate, methacrylic acid, alkyl methacrylate, acrylamide, methacrylamide, diacetone acrylamide, methylol diacetone acrylamide, vinylalkyl ether, vinylalkyl ketone, butadiene, isoprene, chloroprene, glycidyl acrylate, maleic anhydride, and mixtures thereof.

* * * * *